UNITED STATES PATENT OFFICE.

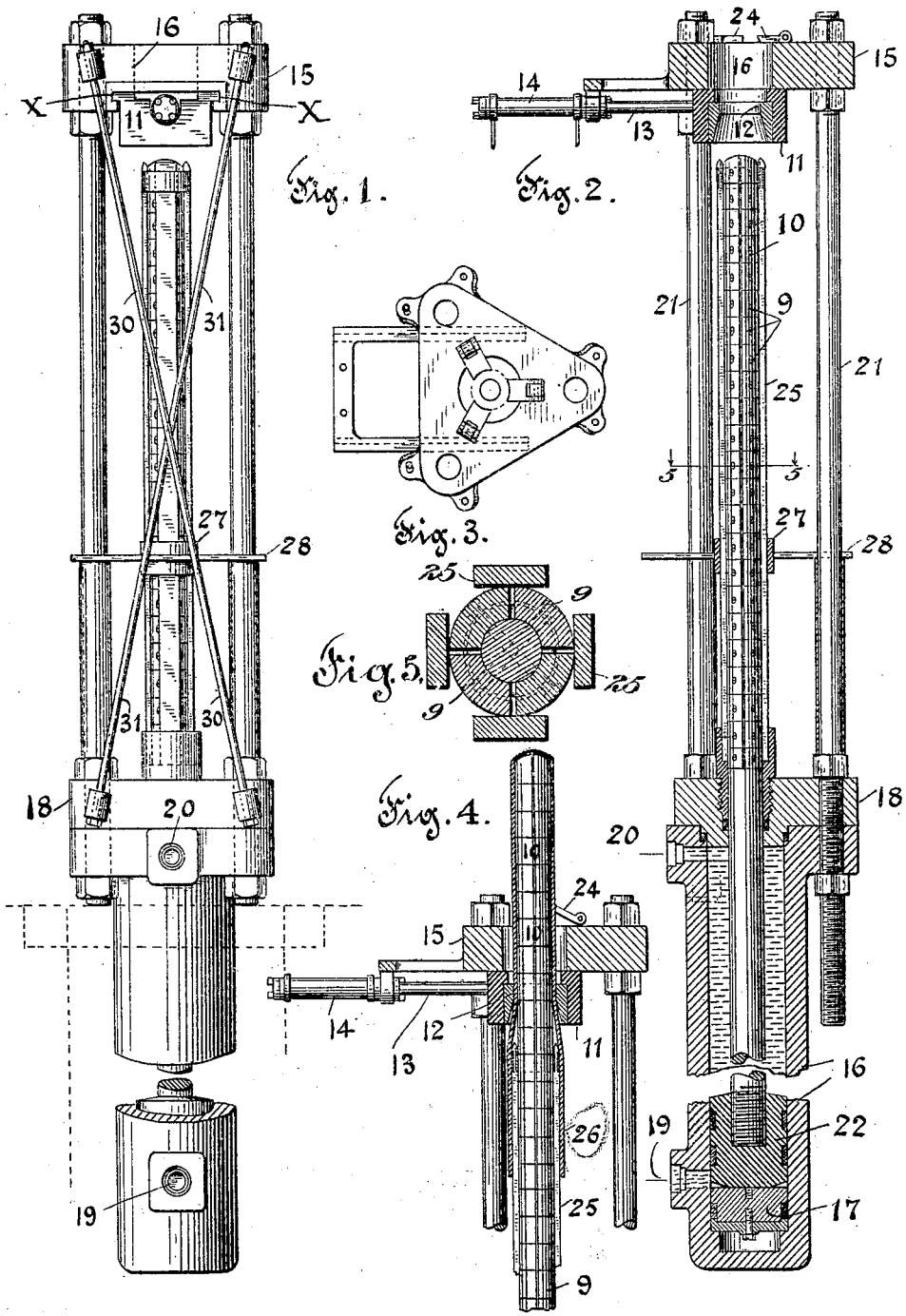
C. P. HIGGINS.
MACHINE FOR FORMING SEAMLESS TUBES.
APPLICATION FILED SEPT. 21, 1906.
961,132. Patented June 14, 1910.

CAMPBELL P. HIGGINS, OF ROSELLE, NEW JERSEY, ASSIGNOR TO THE BABCOCK & WILCOX COMPANY, OF BAYONNE, NEW JERSEY, A CORPORATION OF NEW JERSEY.

MACHINE FOR FORMING SEAMLESS TUBES.

961,132. Specification of Letters Patent. Patented June 14, 1910.

Application filed September 21, 1906. Serial No. 335,672.

*To all whom it may concern:*

Be it known that I, CAMPBELL P. HIGGINS, a citizen of the United States, residing at Roselle, in the county of Union and State of New Jersey, have invented certain new and useful Improvements in Machines for Forming Seamless Tubes, of which the following is a specification, reference being had therein to the accompanying drawing.

This invention relates to a machine for drawing seamless tubes in which the tube is reduced in diameter and increased in length by a continuous pass through a die from which the mandrel or male die can be readily withdrawn from the tube after the drawing operations.

The invention consists in means for centering the tubing on the mandrel before the same is subjected to the process of drawing; to a movable die holder and connecting mechanism for placing and withdrawing the same to and from the line of the movement of the mandrel.

Referring to the several views, illustrated by the drawings, in which similar reference numerals denote similar parts throughout, Figure 1 is a side elevation of a machine for drawing seamless tubing, embodying my invention. Fig. 2 is a vertical sectional view of same partly in elevation. Fig. 3 is a top plan view, and Fig. 4 is a sectional view of the upper parts of the machine showing in their operative position the mandrel and combined devices. Fig. 5 is a transverse section of the mandrel on the plane of the line 5—5 of Fig. 2 on an enlarged scale.

The operative parts of the machine represented in the drawings consist of a mandrel or male die 9 carrying a plurality of expandible section rings 10, (shown in Fig. 5), the particular construction of which is made the subject matter of a separate application for Letters-Patent filed September 21, 1906, Serial Number 335,668. Immediately above the mandrel is a die block or holder 11, carrying a removable die 12 and connected with the die holder 11 is a piston rod 13, actuated by means of a piston within the cylinder 14, to impart a lateral movement to the die holder 11 which is provided with guide ways X, as shown in Fig. 1. The object of this movable die holder is to withdraw the die from the line of movement of the male die in order to pass the tube blank to be reduced through the aperture 16 in the head 15 and place it upon the male die.

As a means of forcing the mandrel 9 through the die 12 and returning the same to its normal position, I provide at the lower end thereof a piston 22 provided with suitable packing rings all incased in a cylinder 16, which is closed at its lower end by a plug 17 and at its upper end by a triangular head 18. Hydraulic or other suitable power is admitted alternately through the ports 19 and 20, for raising or lowering the piston 22 and the mandrel 9.

Adjustably mounted on the cylinder head are three supporting pillars 21 holding a triangular block 15 and through the center of the block 15 an aperture 16 is made of proper dimension to admit a blank tube previous to the drawing operation. Assembled about the aperture 16, pawls 24 are hinged to the upper side of the head 15.

A cage 25 (see Fig. 4) of somewhat smaller diameter than the inside of the tube blank 26 is placed around the mandrel 9, having its lower end fixed to the cylinder head 18 (see Fig. 2) and at a suitable point an adjustable collar 27 encircles the cage 25 and is carried by a spider 28 having cylindrical bearings, which engage the pillars 21.

To render the frame formed by the pillars 21 and head blocks 18 and 15 more rigid I employ cross tie rods 30 and 31 connected to the head blocks, as shown in Fig. 1.

The die 12, which is removable from the die holder 11 has a tapering hole, substantially as shown in Fig. 2, and the smaller diameter of the die 12 conforms with the size of the tubing to be drawn.

The operation of the machine is as follows:—The die 12 and holder 11 being first drawn to one side from under the aperture 16 and the hinged pawls 24 thrown back, a tube 26 having a closed end is dropped through the aperture 16 and fits easily over the centering cage 25 and is lowered thereon. The die 12 and holder 11 and pawls 24 are then returned to their normal position, as shown in Fig. 2, and power is then applied at port 19, thus raising the piston 22 and mandrel 9 until the upper end of the tubing is pressed against the die 12. As the tube passes off the centering cage 25, and through the die 12, the rings 10 are expanded against the inner wall of the tubing and as the mandrel continues to rise, the tubing is forced through the die 12, thus reducing its diameter as shown in Fig. 4, and at the same time materially increasing its length. After the entire length of tubing has been forced through the die the mandrel continues to rise until the lower end of the tubing is above the pawls 24. Power is then admitted at port 20 and as the mandrel 9 begins to descend the rings 10 contract, permitting a free withdrawal of the same from the tube, which is held stationary by reason of its lower edge coming at rest against the pawls 24.

In practice a number of machines may be employed each successive one having smaller male and female dies than the one preceding it, and in this manner the tubes are gradually reduced in diameter and increased in length until the desired size is obtained.

What I claim and desire to secure by Letters-Patent is:—

1. In a machine for reducing the diameter of a tubular blank and increasing its length, the combination with a movable male die of a stationary cage surrounding said die over which a tube blank is placed for centering the blank prior to its reduction by the female die.

2. The combination with a frame, an apertured head member, of a die holder located therebeneath, a female die carried thereby, means for shifting the holder into and out of alinement with the aperture in the head member, a male die, and means for moving the latter longitudinally through the female die.

In testimony whereof I affix my signature in presence of two witnesses.

CAMPBELL P. HIGGINS.

Witnesses:
   AUGUSTE G. PRATT,
   H. S. CHINNOCK, Jr.